US011983147B2

(12) United States Patent
Ali et al.

(10) Patent No.: US 11,983,147 B2
(45) Date of Patent: May 14, 2024

(54) DEDUPLICATING DATA INTEGRITY CHECKS ACROSS SYSTEMS

(71) Applicant: International Business Machines Corporation, Armonk, NY (US)

(72) Inventors: Asmahan Ali, Poughkeepsie, NY (US); Christina Lara, Tucson, AZ (US); Sasikanth Eda, Vijayawada (IN); Abhishek Jain, Baraut (IN); Sanjay Vipin Gandhi, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 17/337,086

(22) Filed: Jun. 2, 2021

(65) Prior Publication Data
US 2022/0391353 A1 Dec. 8, 2022

(51) Int. Cl.
*G06F 16/174* (2019.01)
*G06F 3/06* (2006.01)

(52) U.S. Cl.
CPC .......... *G06F 16/174* (2019.01); *G06F 3/0608* (2013.01); *G06F 3/0619* (2013.01);
(Continued)

(58) Field of Classification Search
CPC .... G06F 16/174; G06F 3/0608; G06F 3/0619; G06F 3/0641; G06F 3/067; G06F 3/0685
(Continued)

(56) References Cited

U.S. PATENT DOCUMENTS 8,301,673 B2 10/2012 Hyer, Jr. et al.
9,223,788 B2 12/2015 Ranade et al.
(Continued)

FOREIGN PATENT DOCUMENTS

CN       1254748 C     5/2006
CN    103077222 B     1/2016
(Continued)

OTHER PUBLICATIONS

International Search Report and Written Opinion from PCT Application No. PCT/CN2022/091289, dated Aug. 1, 2022.
(Continued)

*Primary Examiner* — Hosain T Alam
*Assistant Examiner* — Saba Ahmed
(74) *Attorney, Agent, or Firm* — Zilka-Kotab, P.C.

(57) ABSTRACT

A computer-implemented method, according to one embodiment, includes: receiving, at a clustered filesystem from a formatted filesystem, a request to perform a data integrity check for a portion of data. A determination is made as to whether the request includes a filesystem type of the portion of data, and in response to determining that the request includes a filesystem type of the portion of data, another determination is made as to whether the clustered filesystem supports the data integrity check for the filesystem type. In response to determining the clustered filesystem supports the data integrity check, another determination is made as to whether the portion of data is currently available. Furthermore, the computer-implemented method includes causing the data integrity check to be performed in response to determining that the portion of data is currently available. Results of performing the data integrity check are also sent to the formatted filesystem.

16 Claims, 9 Drawing Sheets

(52) U.S. Cl.
CPC ............ G06F 3/0641 (2013.01); G06F 3/067 (2013.01); G06F 3/0685 (2013.01)

(58) Field of Classification Search
USPC ......................................................... 707/692
See application file for complete search history.

(56) References Cited

U.S. PATENT DOCUMENTS

| | | |
|---|---|---|
| 10,049,118 B2 | 8/2018 | Patel et al. |
| 10,049,122 B1 | 8/2018 | Faibish et al. |
| 10,983,877 B1* | 4/2021 | Hoffman ............. G06F 11/3034 |
| 2012/0216242 A1* | 8/2012 | Uner ....................... G06F 21/51 |
| | | 726/1 |
| 2018/0018218 A1* | 1/2018 | Rat ...................... G06F 3/0619 |
| 2018/0196816 A1* | 7/2018 | Maybee ............. H04L 67/1095 |
| 2021/0117134 A1* | 4/2021 | Keys .................... G06F 3/0643 |

FOREIGN PATENT DOCUMENTS

| | | |
|---|---|---|
| CN | 102750342 B | 9/2016 |
| CN | 108875061 A | 11/2018 |
| CN | 109478159 A | 3/2019 |
| CN | 110598467 A | 12/2019 |
| WO | 2018128917 A1 | 7/2018 |

OTHER PUBLICATIONS

Linfo, "Filesystems: A Brief Introduction," LINFO, Apr. 16, 2004, 7 pages, retrieved from http://www.linfo.org/filesystem.html.

Stack Exchange, "What is metadata, and how does it aid in the "fsck" process?" Unix & Linux StackExchange, 2011, 3 pages, retrieved from https://unix.stackexchange.com/questions/23252/what-is-metadata-and-how-does-it-aid-in-the-fsck-process.

* cited by examiner

DEDUPLICATING DATA INTEGRITY CHECKS ACROSS SYSTEMS

BACKGROUND

The present invention relates to data storage, and more specifically, this invention relates to deduplicating data integrity checks across different filesystems.

Some filesystems utilize inodes which are data structures, each of which describes a filesystem object, e.g., such as a file or a directory. Each inode contains information about the corresponding filesystem object such as an inode number (e.g., a unique identification number), the owner and group associated with the file, a permission list associated with the file, etc. It follows that an individual inode can contain actual file data, directory information (e.g., metadata), or be unused or "free".

The act of creating a new file thereby involves changing the state of an inode from free to allocated, actually writing data to the new file, and updating the corresponding metadata to reflect these changes. However, it is possible for a failure event to occur before this process of creating a new file is able to complete, which can cause substantial filesystem corruption in certain situations. Data integrity checks can be performed in an attempt to remedy this corruption when it is experienced, e.g., such as filesystem consistency check (FSCK) or other commands that are able to address system corruption.

These data integrity checks typically involve reading metadata, including inodes, and attempting to resolve inconsistency issues. While these data integrity checks can overcome corruption, they are computationally intensive and can be prone to unnecessary duplication in environments that implement different filesystems.

SUMMARY

A computer-implemented method, according to one embodiment, includes: receiving, at a clustered filesystem from a formatted filesystem, a request to perform a data integrity check for a portion of data. A determination is made as to whether the request includes a filesystem type of the portion of data, and in response to determining that the request includes a filesystem type of the portion of data, another determination is made as to whether the clustered filesystem supports the data integrity check for the filesystem type of the portion of data. In response to determining the clustered filesystem supports the data integrity check for the filesystem type of the portion of data, another determination is made as to whether the portion of data is currently available. Furthermore, the computer-implemented method includes causing the data integrity check to be performed on the portion of data in response to determining that the portion of data is currently available. Results of performing the data integrity check are also sent to the formatted filesystem.

A computer program product, according to another embodiment, includes a computer readable storage medium having program instructions embodied therewith. Furthermore, the program instructions are readable and/or executable by a processor to cause the processor to: perform the foregoing method.

A system, according to yet another embodiment, includes: a processor; and logic integrated with the processor, executable by the processor, or integrated with and executable by the processor. Moreover, the logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
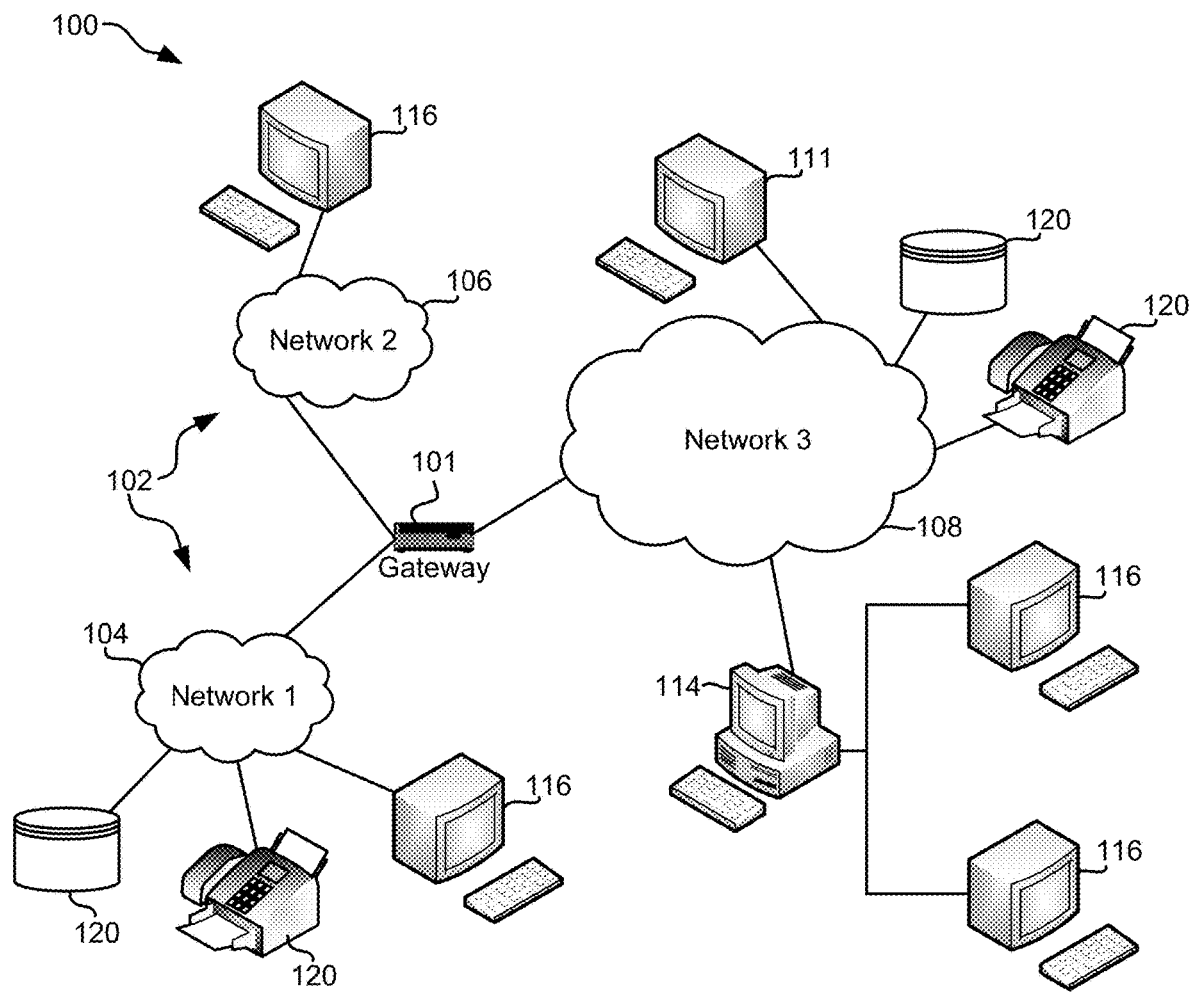
FIG. 1 is a diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for reducing the computational resources that are consumed by deduplicating data integrity checks across filesystems while also ensuring effective performance of the system overall is maintained. Moreover, by selectively utilizing resources with greater computational throughput to perform these deduplicated and computationally intensive data integrity checks, various ones of the embodiments herein are able to further improve computational performance by reducing latency and increasing throughput, e.g., as will be described in further detail below.

In one general embodiment, a computer-implemented method includes: receiving, at a clustered filesystem from a formatted filesystem, a request to perform a data integrity check for a portion of data. A determination is made as to whether the request includes a filesystem type of the portion of data, and in response to determining that the request includes a filesystem type of the portion of data, another determination is made as to whether the clustered filesystem supports the data integrity check for the filesystem type of the portion of data. In response to determining the clustered filesystem supports the data integrity check for the filesystem type of the portion of data, another determination is made as to whether the portion of data is currently available. Furthermore, the computer-implemented method includes causing the data integrity check to be performed on the portion of data in response to determining that the portion of data is currently available. Results of performing the data integrity check are also sent to the formatted filesystem.

In another general embodiment, a computer program product includes a computer readable storage medium having program instructions embodied therewith. Furthermore, the program instructions are readable and/or executable by a processor to cause the processor to: perform the foregoing method.

In yet another general embodiment, a system includes: a processor; and logic integrated with the processor, executable by the processor, or integrated with and executable by the processor. Moreover, the logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
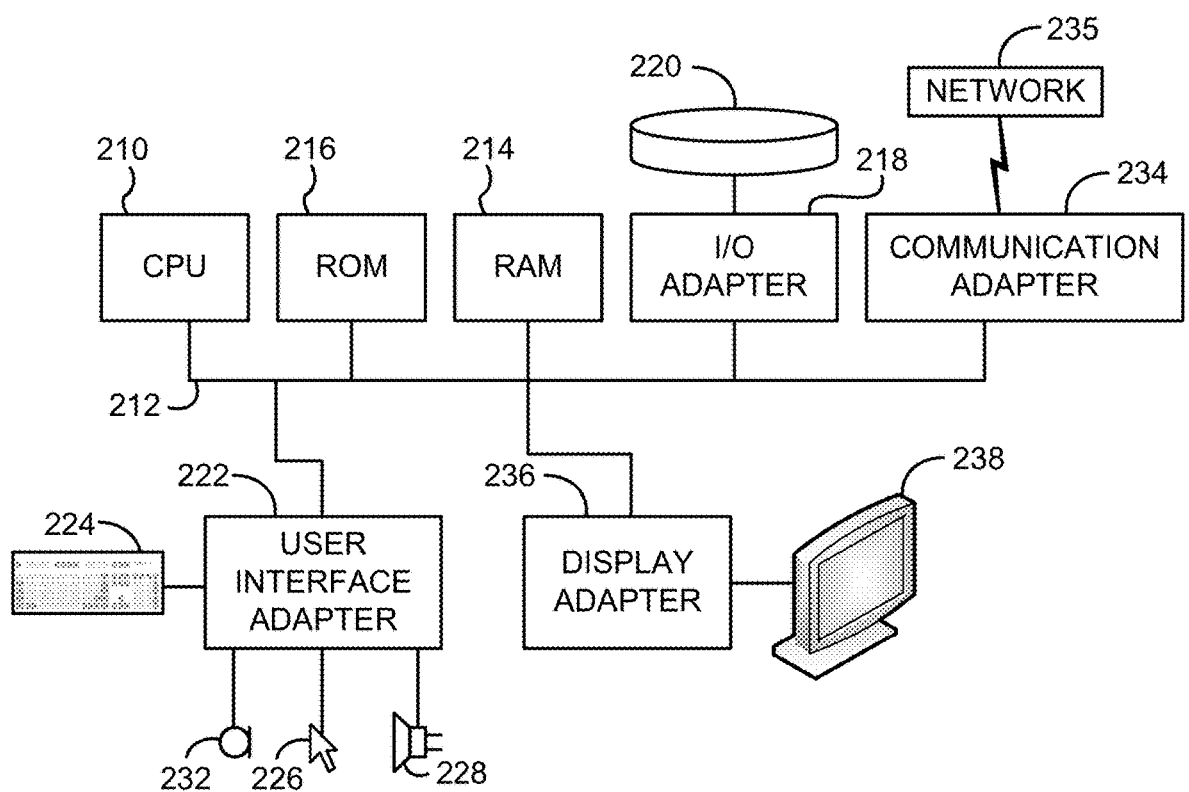
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
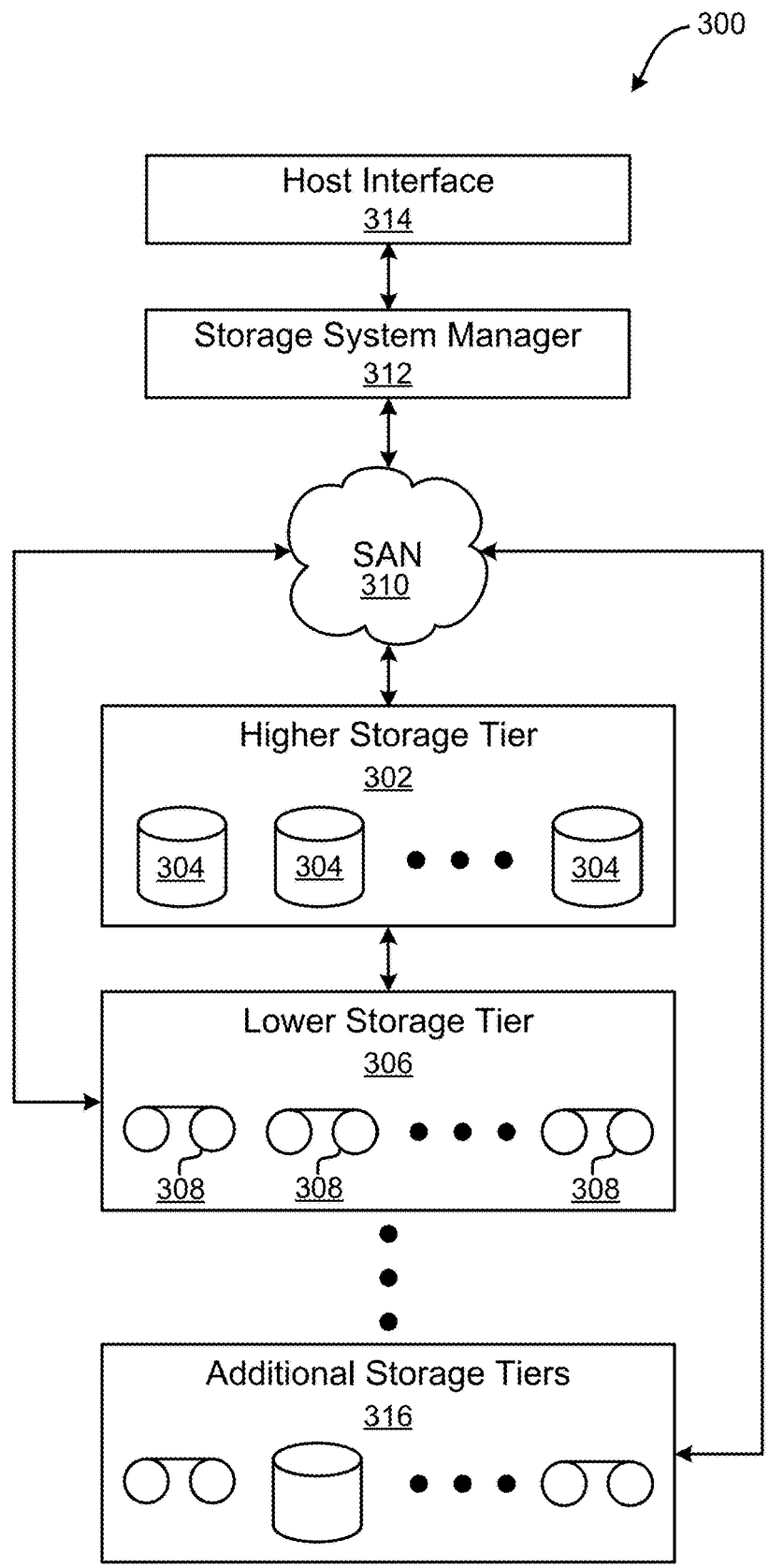
FIG. 3 is a diagram of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, applications that are configured in software-based entities like containers or virtual machines perform data operations (e.g., read and write operations) which are specific to their local filesystems, respectively. The data operations performed by such software-based entities may thereby only be understood (e.g., known) by the operating system of the software-based entities. While entities like containers and virtual machines have their own local filesystems, they also share an overarching filesystem with other entities in the same location. As a result, the entities are able to achieve a reduction in overall size as well as computing resource consumption.

Although utilizing entities like containers and virtual machines has some advantages, conventional implementations that rely on these entities have suffered from significant inefficiencies in practice. These inefficiencies result from the fact that the software-based entities have limited computing capabilities, thereby causing them to act as bottlenecks for data operations that are performed. The local filesystem of each software-based entity also has difficulties coordinating with the overarching filesystem, thereby causing significant inefficiencies and performance loss during system operation.

In sharp contrast, various ones of the embodiments included herein are able to reduce the computational resources that are consumed during operation by deduplicating data integrity checks while also ensuring effective performance of the system overall is maintained. This desirably allows for various ones of the embodiments included herein to achieve significant and material improvements to the efficiency by which storage systems are able to operate, while also ensuring data operations are successfully satisfied. Moreover, by selectively utilizing resources with greater computational throughput to perform these data integrity checks, various ones of the embodiments herein are able to further improve computational performance by reducing latency and increasing throughput, e.g., as will be described in further detail below.

Figure 4:
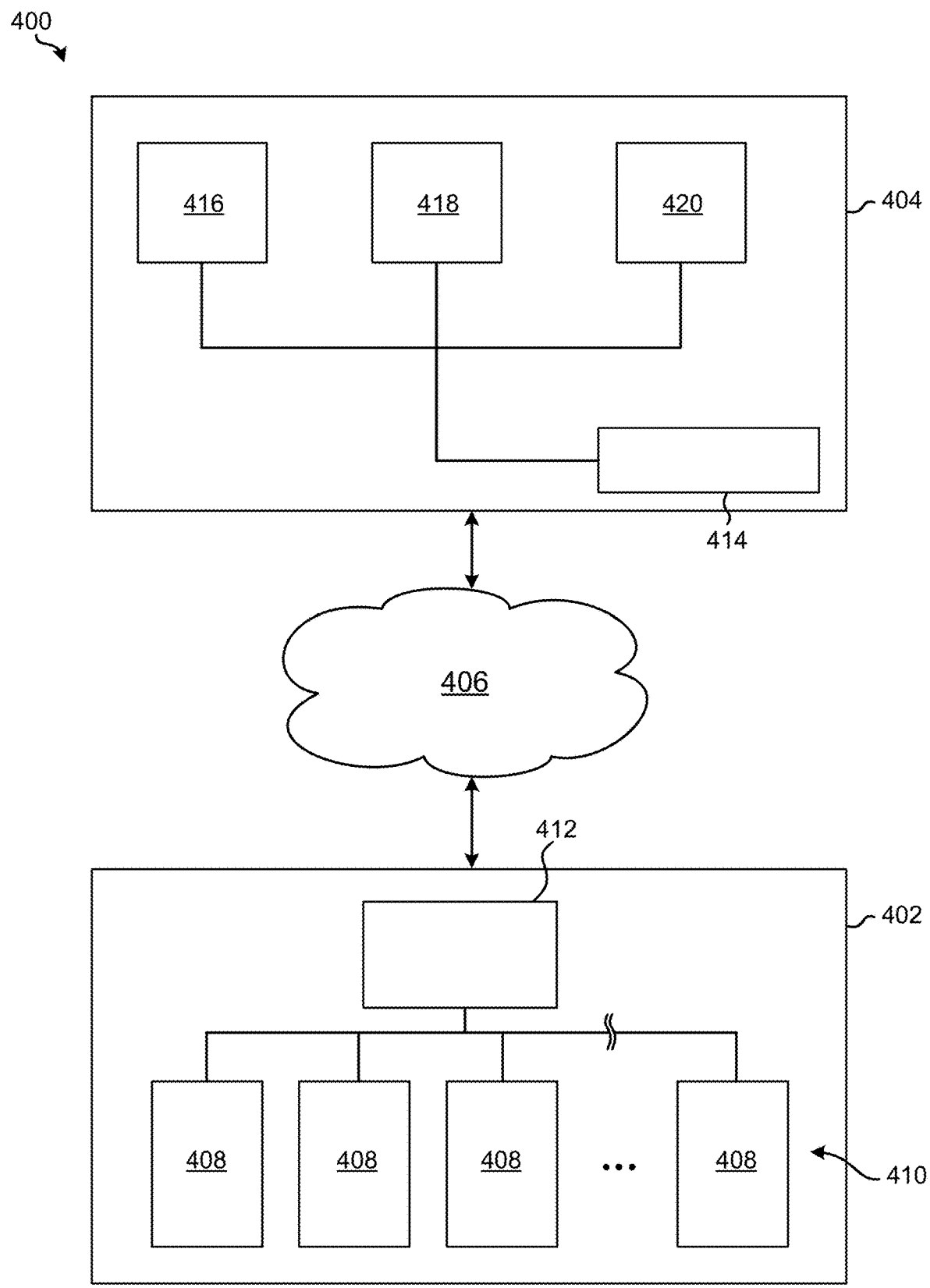
FIG. 4 is a partial representational view of a storage system, in accordance with one embodiment.

Looking now to FIG. 4, a storage system 400 is depicted in accordance with one embodiment. As an option, the present system 400 may be implemented in conjunction with features from any other embodiment listed herein, such as those described with reference to the other FIGS. However, such 400 and others presented herein may be used in various applications and/or in permutations which may or may not be specifically described in the illustrative embodiments listed herein. Further, the 400 presented herein may be used in any desired environment. Thus FIG. 4 (and the other FIGS.) may be deemed to include any possible permutation.

As shown, the overarching storage system 400 includes a storage environment 402 and a container environment 404. It should be noted that the term "environment" is in no way intended to be limiting, and either of these environments 402, 404 may include any desired components, software, etc. According to the present approach, the storage environment 402 is depicted as including a plurality of data storage devices 408 which together form a storage subsystem 410 for the overarching storage system 400. The data storage devices 408 may include any type(s) of memory depending on the approach, e.g., such as HDDs, SSDs, magnetic tape libraries, etc. The data storage devices 408 are also coupled to a controller 412 which may be used to direct data flows, run software programs, perform data operations, communicate with the container environment 404, etc. In some approaches, the controller 412 may be used, at least in part, to maintain a clustered filesystem at the storage environment 402.

Looking now to the container environment 404, a container orchestrator 414 is present and may be used to manage the containers 416, 418, 420 that exist (or at least function) in the container environment 404. The container orchestrator 414 may thereby function as a controller in some approaches. Moreover, each of the containers 416, 418, 420 preferably map back to data that is physically stored in the data storage devices 408 of the storage subsystem 410 and therefore may be used to manage the data. For instance, each of these containers 416, 418, 420 may represent a portion of an application that is embodied as a single package that can be moved, in total, from one computing environment to another. It follows that in some approaches, multiple application containers may be permitted to access the same data, thereby allowing for these application containers to be created, moved, destroyed, etc., without actually affecting the underlying data to which these containers map. As a result, data that is held in containers is preferably done so in a stateless nature, e.g., such that the data remains identical regardless of how many times it is iterated across different operating systems and/or applications.

It should also be noted that while the container environment 404 is depicted as only including containers in FIG. 4, virtual machines, applications, etc., or any other desired type of software-based entities may also exist (or at least function, be performed, etc.) in the container environment 404. The container orchestrator 414 may thereby be able to manage (e.g., monitor, control, interact with, etc.) any desired type of software-based entity that exists in the container environment 404, e.g., as would be appreciated by one skilled in the art after reading the present description.

For example, virtual machine and container environments allow administrators to host and manage their application workloads while users benefit from development speed and operational efficiency. As a result, users and/or developers are given the flexibility to move workloads around a system based on the particular situation. In some approaches, a user is able to migrate their application workload between containers and virtual machines, or divide the application workload within the same orchestrator. It follows that the use of the term "container" herein is in no way intended to be limiting and any desired type of software-based entities may be implemented.

With continued reference to FIG. 4, the storage environment 402 and the container environment 404 are preferably able to communicate with each other by sending data, commands, requests, metadata, updates, etc. therebetween. In the present approach, the storage and container environments 402, 404 are able to communicate with each other over the network 406 that extends between the two environments, but any form of communication may be used. For example, in other approaches the storage and container environments 402, 404 may communicate over a physical electrical connection that extends between the two environments, but any type of communication channel may be used. It should also be noted that the network 406 depicted in FIG. 4 may be of any type, e.g., depending on the desired approach. For instance, in some approaches the network 406 is a WAN, e.g., such as the Internet. However, an illustrative list of other network types which network 406 may implement includes, but is not limited to, a LAN, a PSTN, a SAN, an internal telephone network, etc. Accordingly, the storage environment 402 and the container environment 404 are able to communicate with each other regardless of the amount of separation which exists therebetween, e.g., despite being positioned at different geographical locations.

As previously mentioned, applications that are configured in software-based entities like containers (e.g., see 416, 418, 420 in FIG. 4) or virtual machines perform data operations (e.g., read and write operations) which are specific to their local filesystems, respectively. The local filesystems provide a platform that may be used to perform local data operations without affecting the actual data in physical storage. However, the data operations performed by such software-based entities may thereby only be understood (e.g., known) by the operating system of the software-based entities. While entities like containers and virtual machines have their own local filesystems, they also share an overarching filesystem with other entities in the same location. As a result, the entities are able to achieve a reduction in overall size as well as computing resource consumption.

Although utilizing entities like containers and virtual machines has some advantages, conventional implementations that rely on these entities have suffered from significant inefficiencies in practice. These inefficiencies result from the fact that the software-based entities have limited computing capabilities, thereby causing them to act as bottlenecks for data operations that are performed. The local filesystem of each software-based entity also has difficulties coordinating with the overarching filesystem, thereby causing significant inefficiencies and performance loss during system operation as the effects of any inefficiency can be multiplied across multiple different locations.

In stark contrast to these conventional shortcomings, various ones of the processes included in method 500 are able to significantly improve performance by deduplicating operations and reducing computational resource consumption. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment using known techniques and/or techniques that would become readily apparent to one skilled in the art upon reading the present disclosure. In various other embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

At least some of the processes included in method 500 may be performed by one of the processors (e.g., controllers, orchestrators, CPUs, etc.) that are included in the system 400 of FIG. 4. For instance, the processes included in method 500 may be performed by controller 412 at the storage environment 402 of FIG. 4. The controller 412 would thereby be able to communicate with the container orchestrator 414 over network 406. In other approaches, at least some of the processes included in method 500 may be performed by the container orchestrator 414 at the container environment 404 of FIG. 4. The container orchestrator 414 would thereby be able to communicate with the container controller 412 over network 406. It follows that performing method 500 typically involves communication extending between at least two different environments, each of which includes a different filesystem, e.g., as will be described in further detail below. Additionally, while the processes included in method 500 have been described in the context of being performed by a controller at a storage environment having a clustered filesystem (e.g., controller 412 at the storage environment 402 of FIG. 4), this in in no way intended to be limiting.

Figure 5:
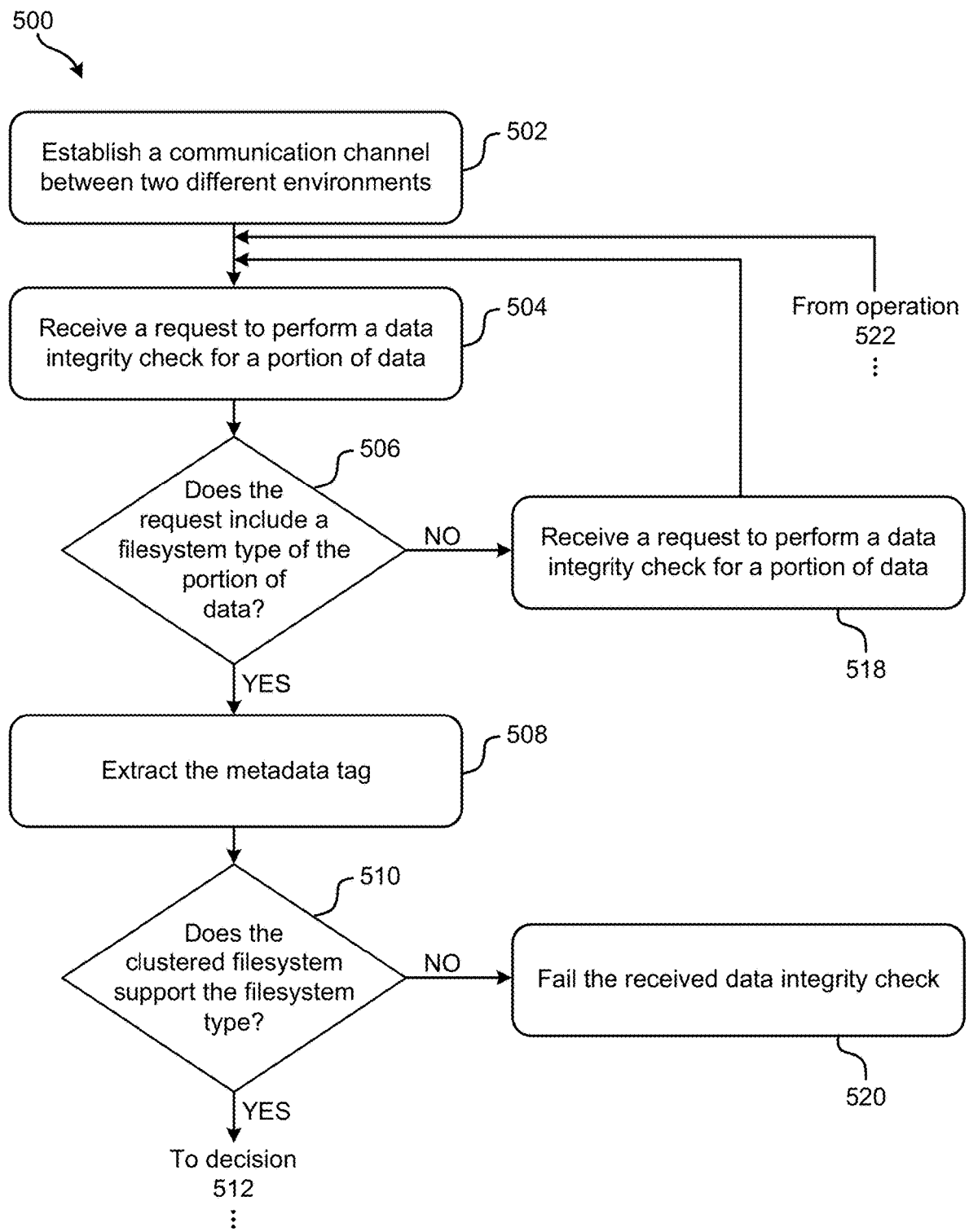
FIG. 5 is a flowchart of a method, in accordance with one embodiment.
Figure 5:
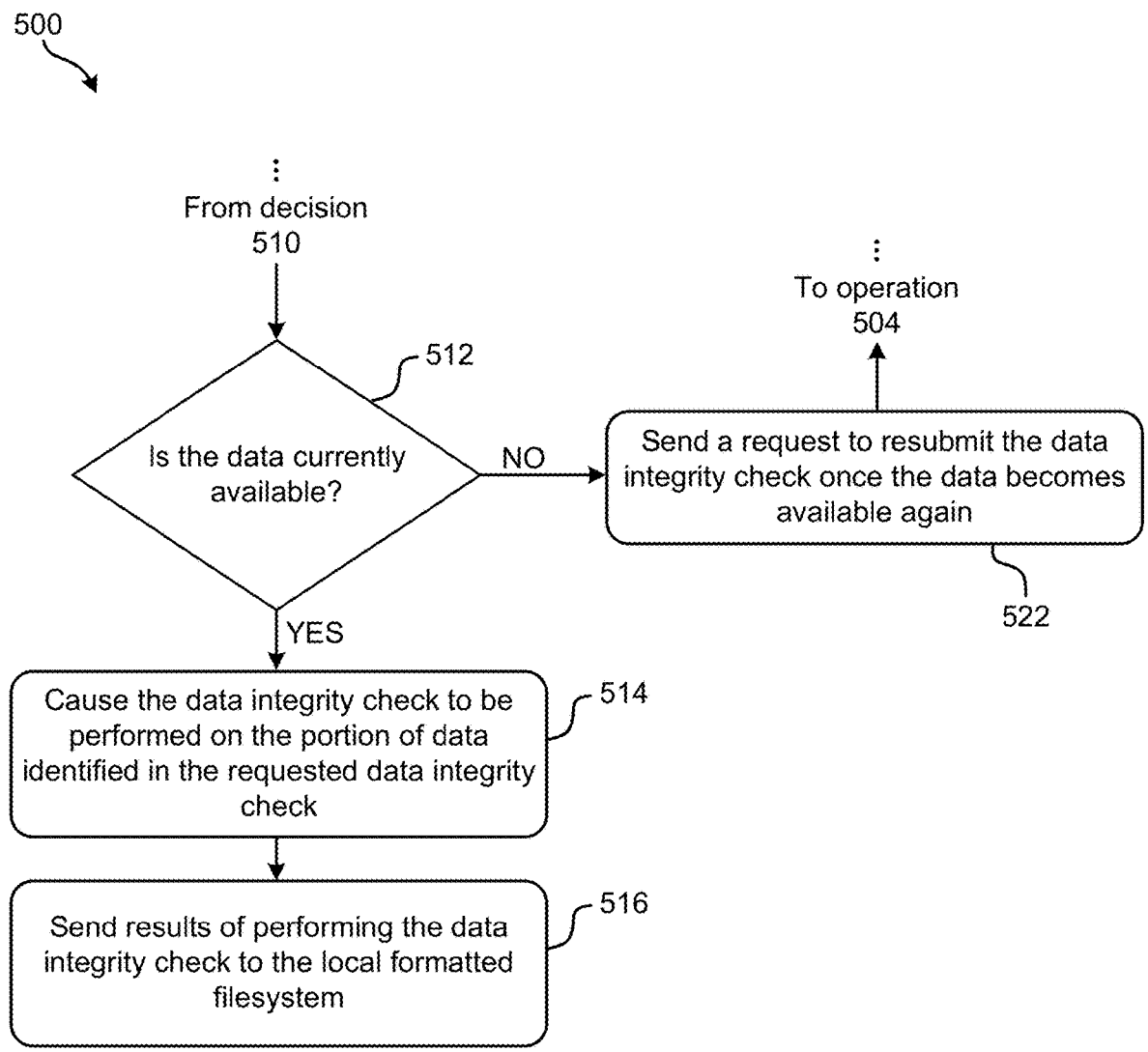

Referring now to FIG. 5, operation 502 of method 500 includes establishing a communication channel between two different environments. As mentioned above, each of these environments are preferably associated with a different filesystem. For example, one of the environments may correspond to a clustered filesystem (e.g., clustered filesystem at storage environment 402 of FIG. 4), while another of the environments corresponds to a local filesystem (e.g., local filesystems at each of containers 416, 418, 420 in FIG. 4). Moreover, although various ones of the processed described herein involve two different environments, it should be noted that this in no way intended to be limiting. Depending on the desired approach, one or more of these processes may be used to deduplicate data operations across three or more different filesystems, e.g., as would be appreciated by one skilled in the art after reading the present description.

According to some embodiments, the communication channel established in operation 502 may actually extend between processes being performed in the different filesystems (or at least the controllers performing and/or managing the processes, respectively). For example, in some approaches, operation 502 includes establishing a communication channel that extends between a data integrity check in a local formatted filesystem and a data integrity check in a clustered filesystem. Referring momentarily to FIG. 4, it follows that a communication channel may be formed between a data integrity check being performed in a local formatted filesystem associated with any one of the containers 416, 418, 420 in the container environment 404, and a data integrity check being performed by controller 412 in the clustered filesystem associated with the storage environment 402. The communication channel is thereby able to identify if particular data stored in the backend clustered filesystem has been exported and used in local formatted filesystems, e.g., for application storage.

While the specific type of communication channel may vary depending on the type of filesystems involved, the entities between which it is formed, etc., the type of data integrity check may also vary depending on the approach. For instance, in some approaches the data integrity check is a FSCK process. It follows that in such approaches, the communication channel may be established to extend between a FSCK process in the local formatted filesystem (e.g., having containers and/or virtual machines) and a FSCK process in the clustered filesystem (e.g., which serves as the storage subsystem). The communication channel itself may thereby implement any protocols associated with performing a FSCK process and may be formed using any wired and/or wireless components included at ether filesystem locations as well as any components which may already be used to facilitate communication between the filesystems (e.g., see network 406 in FIG. 4).

With continued reference to FIG. 5, operation 504 includes receiving a request to perform a data integrity check for a portion of data. The request may be received at a clustered filesystem of a storage environment from at least one of the local formatted filesystems along the communication channel that exists therebetween. Moreover, the data integrity check may be requested in response to experiencing a filesystem corruption in at least one of the local formatted filesystems. Accordingly, in some approaches the data integrity check is a FSCK process.

In preferred approaches the request includes metadata that provides additional information associated with the desired data integrity check. For instance, the request may include information (e.g., metadata) that identifies the type of filesystem that the data corresponds to and/or is currently included in. Some filesystems use inode data structures, each of which correspond to an object such as a file or directory. Inodes that correspond to a given file (e.g., grouping of data) contain information about that given file which may include an inode number (a unique identification number); the owner and/or group associated with the given file; the file and/or filesystem type; a permission list associated with the given file; file creation, access, and modification times; the size of the file; a physical storage location of the given file; etc. It follows that an individual inode can contain actual file data, directory information (e.g., metadata associated with a file), or be unused (also referred to herein as "free"). Moreover, the act of creating a new file involves changing the state of a corresponding inode from free to allocated, writing data to the new file, and updating metadata that is associated with the new file.

While this process of forming and updating files allows for data in storage to be more effectively managed and accessed, computing failures (e.g., crashes) may occur before the process can be completed, which can cause filesystem corruption. One way to overcome these filesystem corruptions as they occur over time is to perform data integrity checks which typically involve examining metadata (e.g., inodes) and attempting to resolve inconsistency issues that are identified. For example, FSCK operations are able to perform a number of corrective actions in order to overcome any computing failures that may be experienced during operation. These corrective actions include updating an allocation map to indicate blocks as free that have been incorrectly allocated, create directory entries for files and/or directories that have inodes allocated but for which no directory entries exist, remove directory entries that point to inodes which are not allocated and/or directory entries which include metadata that contradicts metadata stored in the respective inodes, update link counts on files and/or directories to reflect accurate numbers, etc.

Although data integrity checks like FSCK operations are able to improve performance of the system as a whole, it is important to monitor and prevent operational duplicity. According to an example, which is in no way intended to be limiting, a disk subsystem problem can cause data corruption for files that reside on certain disk addresses, and this inconsistency can be detected by a container's local formatted filesystem as well as the backend clustered filesystem. Left unchecked, FSCK actions would otherwise be promoted in both layers and result in performance loss due to the duplicate execution of the operation at the container local formatted filesystem level as well as the backend storage filesystem level. As noted above, software-based entities like containers are allocated with limited computing resources (e.g., such as CPU cores, RAM, cache, etc.) and therefore the performance of any unnecessary operations (e.g., such as a FSCK operation) results in any active applications to suffer significant down time and performance degradation. However, by achieving coordination between performance of the local formatted filesystems and performance of the backend clustered filesystem, various ones of the approaches included herein are able to significantly reduce consumption of computing resources and decrease operational bottlenecks when possible, by utilizing the higher throughput of the backend clustered filesystem, e.g., as will soon become apparent.

Referring still to FIG. 5, method 500 further includes determining whether the request includes a filesystem type of the portion of data. See decision 506. The particular type of filesystem that a given set of data corresponds to has an impact on how or if a process like a data integrity check can be performed. Different filesystem types involve different processes, protocols, permission levels, etc., and therefore have a significant impact on which types of data integrity checks can be performed and what components are able to perform them.

As mentioned above, metadata can be used to identify the type of filesystem that the data corresponds to and/or is currently included in. Accordingly, decision 506 may be determined by inspecting any metadata that may be received along with the request and/or any metadata which may be stored in memory (e.g., in a lookup table). In some approaches, this decision is made by determining whether the actual portion of data has a metadata tag (also referred to herein as an "extended attribute") corresponding thereto. The metadata tag preferably includes information that is associated with the portion of data and may exist in any desired form. For example, in different approaches a metadata tag may include one or more flags, be in the form of a file header, include one or more keywords and/or terms associated with the data, correspond to inode entries, etc. Moreover, the metadata tag may include any desired type of information such as filesystem type, I/O activity associated with the received request, runtime information, a priority associated with the request and/or the data itself, attached application container details, etc.

It follows that by inspecting any metadata associated with the data, information such as the filesystem type and/or format may desirably be identified. Once the identified metadata as well as the filesystem type and/or format are identified, the backend cluster filesystem can effectively perform data integrity checks for both filesystems using only the backend clustered filesystem itself. For instance, approaches in which a data integrity check includes a FSCK operation that is supported by the clustered filesystem, a FSCK daemon operating in the clustered filesystem may be utilized to actually perform the data integrity check while achieving corrective actions that improves performance of both the local formatted filesystem as well as the backend clustered file system. This desirably avoids any unnecessary consumption of computing resources caused by duplicate operations, while also increasing the efficiency by which the data integrity check is performed as the backend clustered filesystem is capable of achieving significantly higher throughput than the local formatted filesystems, e.g., as described above.

In response to determining that the received request does include information like the filesystem type of the portion of data, the information is preferably extracted for further use. Accordingly, method 500 proceeds from decision 506 to operation 508 in response to determining that the received request does include information like the filesystem type of the portion of data. There, operation 508 includes extracting the metadata tag (or "extended attribute").

According to some approaches, information such as the filesystem type may be extracted by exporting inode data and/or structural information from files that are formatted in the local formatted filesystems. A FSCK daemon of the backend clustered filesystem may be used to inspect the identified files and extract the inode metadata to identify the type of filesystem formatted by the container application. In some cases, a container orchestration layer also helps by passing formatted filesystem information from the container layer to backend clustered filesystem using metadata, e.g., as mentioned above. Based on the inode structure inspection, the FSCK daemon can also determine information associated with the data, e.g., such as the formatted block size, filesystem size, etc., and other information associated with performing a FSCK operation on the file, e.g., as would be appreciated by one skilled in the art after reading the present description.

Referring still to FIG. 5, method 500 proceeds from operation 508 to decision 510 which includes determining whether the clustered filesystem supports the data integrity check for the filesystem type of the portion of data. As mentioned above, the particular type of filesystem that a given set of data corresponds to has an impact on how or if a process like a data integrity check can be performed. Different filesystem types involve different processes, protocols, permission levels, etc., and therefore have a significant impact on which types of data integrity checks can be performed and what components are able to perform them. Accordingly, decision 510 may be determined by comparing the information in the extracted metadata tag to characteristics and/or functionality that is supported by the clustered filesystem.

In response to determining that the clustered filesystem does support the data integrity check for the filesystem type of the portion of data, method 500 proceeds to decision 512 which includes determining whether the portion of data is currently available. In other words, decision 512 includes determining whether the portion of data (e.g., file) associated with the received data integrity check is currently in use or whether it is available to perform the FSCK operation. In some approaches, this determination may be made by identifying whether the portion of data has been exported from the clustered filesystem and/or is currently used as local storage by the local formatted filesystem. Current use information for data may be stored in a logical-to-physical table, a metadata tag associated with the given data, a predetermined location in memory, etc.

In response to determining that the portion of data is currently available in decision 512, method 500 proceeds to operation 514. There, operation 514 includes causing the data integrity check to be performed on the portion of data identified in the requested data integrity check. As noted above, various ones of the processes included in method 500 may be performed by a controller at the storage environment having the clustered filesystem. It follows that at least a portion of the data integrity check may actually be performed by a daemon that is operating in the clustered filesystem of the storage environment. According to some approaches, causing the data integrity check to be performed on the portion of data may actually include sending one or more instructions to a FSCK daemon operating in the clustered filesystem and associated with the FSCK process in the clustered filesystem to perform the data integrity check.

It is desirable that the data integrity check is performed by the backend clustered filesystem as opposed to the local formatted filesystems because of the efficiency that is gained by utilizing the greater computational throughput thereof. As mentioned above, entities like containers and virtual machines have limited computing capabilities, thereby causing them to act as bottlenecks for data operations that are performed in conventional implementations. The local filesystem of each software-based entity also has difficulties coordinating with the overarching filesystem, thereby causing significant inefficiencies and performance loss during system operation in conventional implementations. In sharp contrast to these conventional shortcomings, the approaches herein are able to reduce the computational resources that are consumed during operation by deduplicating data integrity checks while also ensuring effective performance of the system overall is maintained. This desirably allows for various ones of the embodiments included herein to achieve significant and material improvements to the efficiency by which storage systems are able to operate, while also ensuring data operations and data integrity checks are successfully satisfied. Additionally, by selectively utilizing resources with greater computational throughput to perform these deduplicated data integrity checks, various ones of the embodiments herein are able to further improve computational performance by reducing latency and increasing throughput overall.

From operation 514, method 500 proceeds to operation 516 which includes sending results of performing the data integrity check to the local formatted filesystem. The information included in the results that are sent to the local formatted filesystem may vary depending on the particular approach, e.g., based on the type of data integrity check performed, the filesystem type, user preferences, predetermined settings, etc. According to some approaches, the results of performing the data integrity check that are sent to the local formatted filesystem may include FSCK timestamps, a status of the FSCK operation, corrupted file details, etc. This information may thereby be used by the local formatted filesystem to implement the results of the data integrity check without actually performing the data integrity check in the local formatted filesystem. As noted above, this desirably reduces the amount of computing resources that are consumed while ensuring the overarching system maintains efficient and successful performance.

In response to performing operation 516, method 500 may end. However, it should be noted that although method 500 may end in response to performing operation 516, any one or more of the processes included in method 500 may be repeated in order to satisfy additional data integrity checks. In other words, any one or more of the processes included in method 500 may be repeated for subsequently received data integrity checks.

Returning now to decision 506, method 500 actually proceeds to operation 518 in response to determining that the request does not include a filesystem type of the portion of data. In other words, method 500 proceeds to operation 518 in response to determining that there is no way to identify the filesystem type that is associated with the portion of data. There, operation 518 includes sending a request to the local formatted filesystem(s) to update the request to include metadata that at least identifies the filesystem type that is associated with the given data. In some approaches, this request may be satisfied by a local formatted filesystem appending an extended attribute to the data integrity check request before resubmitting the request. Accordingly, from operation 518, method 500 returns to operation 504 such that the updated request and/or another request may be received and processed according to the various approaches described and/or suggested herein.

Looking now to decision 510, method 500 proceeds to operation 520 in response to determining that the clustered filesystem does not support the data integrity check for the filesystem type of the portion of data. As mentioned above, the particular type of filesystem that a given set of data corresponds to has an impact on how or even if a process like a data integrity check can be performed. Different filesystem types involve different processes, protocols, permission levels, etc., and therefore have a significant impact on which types of data integrity checks can be performed and what components are able to perform them. It follows that operation 520 includes failing the received data integrity check. In response to performing operation 520, method 500 may end. However, in some approaches an indication of the failed request may be sent to the entity and/or program that initially issued the request, e.g., such that it may be resubmitted in a different filesystem type.

Furthermore, returning to decision 512, method 500 proceeds to operation 522 in response to determining that the portion of data that corresponds to the received request is currently unavailable. In other words, method 500 proceeds to operation 522 in response to determining that the portion of data (e.g., file) associated with the received data integrity check is currently in use and thereby cannot be used to perform the data integrity check. There, operation 522 includes sending a request to resubmit the data integrity check once the data becomes available again. Depending on the approach, this may be achieved in a number of different ways. For instance, in some situations a time delay may simply be applied in operation 522 before reperforming decision 512 itself. This allows time for the relevant data to be returned to a "free" state before reattempting to proceed with the requested data integrity check. In still other approaches, the failed data integrity check may be stored in memory to maintain a record of data that has not yet been repaired, e.g., for future iterations. In still other approaches, the requested data integrity check may actually be returned to the entity and/or program that initially issued the request, e.g., such that it may be resubmitted at a later point in time.

It follows that various ones of the processes included in method 500 are desirably able to reduce the computational resources that are consumed during operation by deduplicating data integrity checks while also ensuring effective performance of the system overall is maintained. This desirably allows for various ones of the embodiments included herein to achieve significant and material improvements to the efficiency by which storage systems are able to operate, while also ensuring data operations and data integrity checks are successfully satisfied. Moreover, by selectively utilizing resources with greater computational throughput to perform these deduplicated data integrity checks, various ones of the embodiments herein are able to further improve computational performance by reducing latency and increasing throughput. In some specific embodiments, this is achieved at least in part by enhancing daemons operating in a backend clustered filesystem (e.g., such as a FSCK daemon) to offload certain container specific localized tasks to backend clustered filesystem utilities, thereby avoiding duplicate data integrity checks as well as providing increased performance gains and reduced application downtime.

Figure 6:
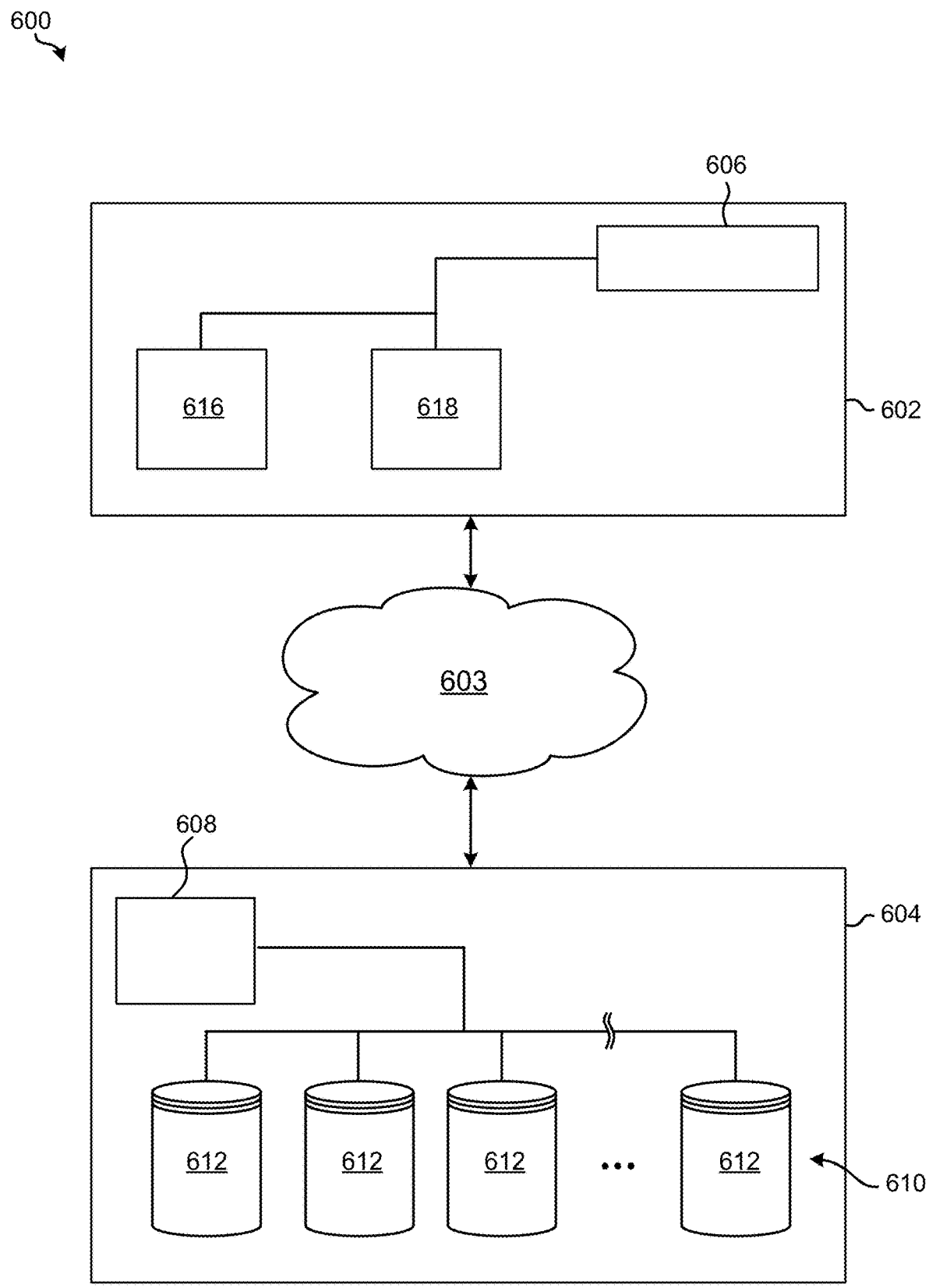
FIG. 6 is a partial representational view of a distributed filesystem, in accordance with an in-use example.

It follows that by selectively utilizing resources with greater computational throughput to perform these deduplicated data integrity checks, various ones of the embodiments herein are able to further improve computational performance by reducing latency and increasing throughput overall. Looking now to FIG. 6, a distributed filesystem 600 is illustrated in accordance with an in-use example of how to offload a FSCK operation from a container filesystem 602 to a backend clustered filesystem at a storage environment 604. It should be noted that this in-use example is presented for illustrative purposes only and is in no way intended to limit the invention.

As shown, the container filesystem 602 includes containers 616, 618 as well as a container orchestrator 606. Moreover, the container filesystem 602 can communicate with the storage environment 604 using the network 603 that extends between the two environments, but any form of communication may be used. For example, in other approaches the container filesystem 602 and the storage environment 604 may communicate over a physical electrical connection that extends between the two environments, but any type of communication channel may be used. It should also be noted that the network 603 may be of any type, e.g., depending on the desired approach. Accordingly, the container filesystem 602 and the storage environment 604 are able to communicate with each other regardless of the amount of separation which exists therebetween, e.g., despite being positioned at different geographical locations.

The container orchestrator 606 is thereby able to send indications to the controller 608 in the storage environment 604 that indicate the files and/or devices that are currently being used in the containers 616, 618. This desirably allows the storage environment 604 to determine if a file stored in the storage subsystem 610 of the backend cluster filesystem has been exported or used as local storage for a given container. As mentioned, some approaches utilize cloud orchestration hints sent from a container orchestrator to make this identification of files (e.g., groupings of data). It should also be noted that the storage subsystem 610 may include any desired type of storage devices 612, e.g., such as HDDs, SSDs, magnetic tape libraries, etc.

Moreover, the orchestration layer may actually contain the relationship between the storage resources of the containers 616, 618 (and any other software-based entities in the container filesystem 602, e.g., such as virtual machines) with respect to their corresponding backend storage. In addition to the orchestration layer, storage drivers such as container storage interface (CSI) may be used to help facilitate the exporting of backend storage files and/or devices as container local storage is improved to associate metadata properties to indicate the mapping of a given file, e.g., as would be appreciated by one skilled in the art after reading the present description.

The controller 608 may use this information to create a communication channel between data that is stored in storage environment 604 and the local filesystem storage in each of the containers 616, 618, respectively. In other words, the backend clustered filesystem preferably creates communication channels based on the mapping of data that exists in the containers 616, 618 as well as the storage environment 604. In some approaches, the framework will establish dependency mapping between the container formatted local filesystem and data exported from backend storage by appending extra metadata tags (or extended attributes) to the files which include information such as attached application container details, priority, runtime, I/O activity, local file system format and/or type, etc.

The backend clustered filesystem may also export inode data and/or structure from files that have been formatted by the container local filesystems. In other words, daemons operating in storage environment 604 may be enhanced to inspect the identified files and extract any inode metadata to identify the corresponding type of filesystem that has been formatted by the given container application. In some cases, a container orchestration layer may also assist in this process by passing formatted filesystem information from container layer to backend clustered filesystem using metadata. Based on the inode structure inspection, a FSCK daemon of the backend clustered filesystem can also determine the formatted block size, filesystem size, as well as other information so that it is able to perform a FSCK process on the particular file by utilizing the format of the local filesystem. The FSCK daemon may also add a metadata label on the given file(s) based on the inspected filesystem information.

Using the above mapping and inspection of the local formatted file system in container storage, the backend clustered filesystem is able to perform the FSCK process on the files identified in an initially received request. Based on the identified mapping of the container's local filesystem mapping to the actual file in the backend clustered filesystem, the backend filesystem FSCK framework will be enhanced to perform FSCK on the file based on the formatted filesystem. For example, if a local storage filesystem is being formatted by EXT3 in container application, whenever the backend clustered filesystem performs a FSCK activity on that file, it will run the FSCK utility for EXT3 on the file.

The FSCK daemon in the backend clustered filesystem can either implement external native filesystem check routines (e.g., ext3 FSCK) and run the operation on a given file, or alternatively invoke the native OS FSCK process available on the clustered file system node. The relevant container and the backend clustered filesystem will also coordinate when to actually perform the FSCK operation on the given file.

In response to performing a successful FSCK operation on the file in the backend storage environment 604, consistency results will be passed to the container filesystem with details such as last FSCK timestamp, FSCK status (e.g., fail or pass), corrupted file details via RPC or common logging infrastructure, etc. Moreover, if any inconsistencies have been identified in the blocks on backend storage that actually store the corresponding data, the backend storage attempts to perform recovery actions in preferred approaches. However, if these recovery attempts fail, the backend clustered filesystem translates the corruption details to a form that can be interpreted by the local container filesystem and sends the translated corruption details to the container such that the container application can determine what recovery action should be pursued moving forward.

Again, various ones of the approaches described herein are desirably able to reduce the computational resources that are consumed during operation by deduplicating data integrity checks while also ensuring effective performance of the system overall is maintained. Moreover, by selectively utilizing resources with greater computational throughput to perform these deduplicated and computationally intensive data integrity checks, various ones of the embodiments herein are able to further improve computational performance by reducing latency and increasing throughput. As described above, this is achieved in some situations at least in part by enhancing daemons operating in a backend clustered filesystem (e.g., such as a FSCK daemon) to offload certain container specific localized tasks to backend clustered filesystem utilities rather than the thinly provisioned containers, thereby avoiding duplicate data integrity checks as well as providing increased performance gains and reduced application downtime.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
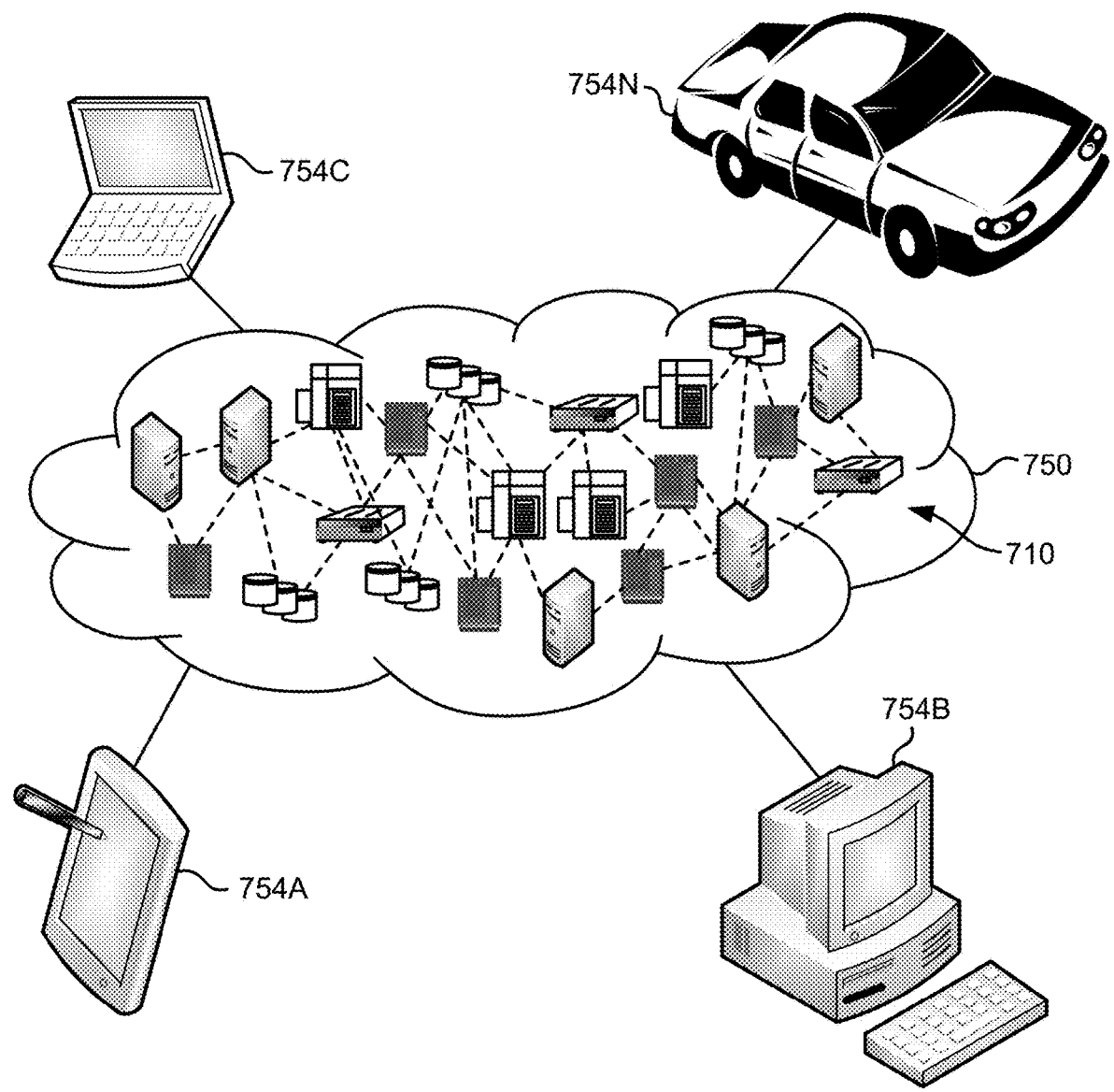
FIG. 7 depicts a cloud computing environment in accordance with one embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-754N shown in FIG. 7 are intended to be illustrative only and that computing nodes 710 and cloud computing environment 750 can communicate with any type of computerized device over any type of network and/or network addressable connection (e.g., using a web browser).

Figure 8:
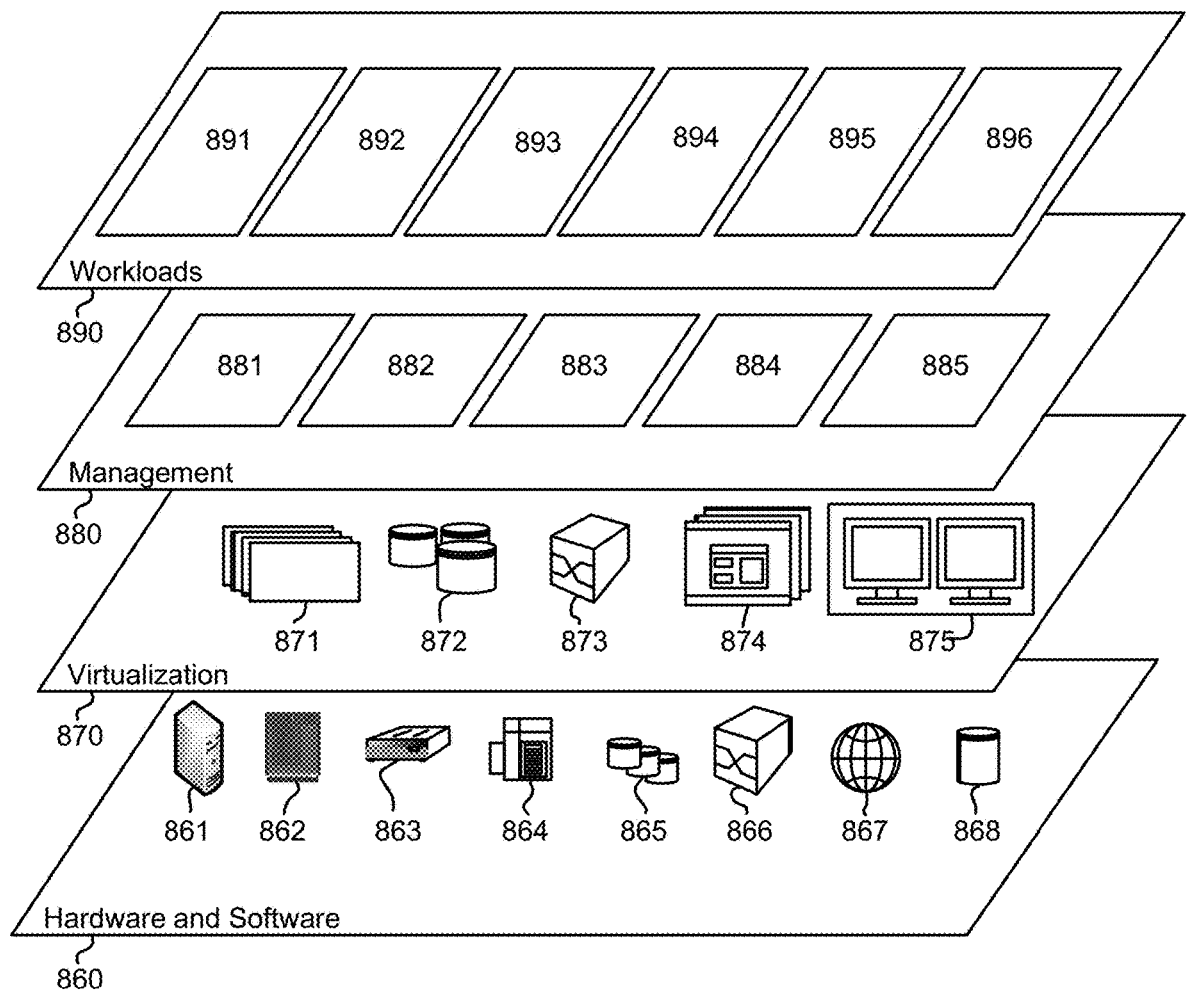
FIG. 8 depicts abstraction model layers in accordance with one embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and deduplicating data integrity checks across different filesystems 896, e.g., according to any of the approaches described and/or suggested herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving, at a clustered filesystem from a formatted filesystem, a first request to perform a data integrity check for a portion of data;
    determining whether the first request includes a filesystem type of the portion of data,
    wherein determining whether the first request includes the filesystem type of the portion of data includes determining whether the portion of data has a metadata tag which corresponds to the portion of data;
    in response to a determination that the portion of data does not have a metadata tag, sending instructions to a FSCK daemon to add a metadata tag on a file that includes the portion of data;
    receiving a second request to perform the data integrity check for the portion of data, wherein the second request includes the metadata tag appended thereto, wherein the metadata tag appended to the second request is in a form of a file header;
    extracting the metadata tag appended to the second request from the second request;
    using the metadata tag extracted from the second request and the metadata tag added to the file for determining whether a second request includes the filesystem type of the portion of data,
    in response to a determination that the second request includes the filesystem type of the portion of data, determining whether the clustered filesystem supports the data integrity check for the filesystem type of the portion of data;
    in response to a determination the clustered filesystem supports the data integrity check for the filesystem type of the portion of data, determining whether the portion of data is currently available;
    in response to a determination that the portion of data is currently available, causing the data integrity check to be performed by the clustered filesystem on the portion of data, wherein the data integrity check is not performed by the formatted filesystem; and
    sending results of performing the data integrity check to the formatted filesystem.

2. The computer-implemented method of claim 1, wherein the data integrity check is a FSCK operation, wherein the FSCK operation includes:
    updating an allocation map to indicate blocks as free that have been incorrectly allocated, creating directory entries for files and/or directories that have inodes allocated but for which no directory entries exist,
    removing directory entries that point to directory entries which include metadata that contradicts metadata stored in the respective inodes, and
    updating link counts on files and/or directories to reflect accurate numbers.

3. The computer-implemented method of claim 2, comprising:
    establishing a communication channel between a FSCK process in the formatted filesystem and a FSCK process in the clustered filesystem,
    wherein the first request is received from the formatted filesystem along the communication channel,
    wherein causing the data integrity check to be performed by the clustered filesystem on the portion of data includes:
        sending one or more instructions to the FSCK daemon to perform the data integrity check.

4. The computer-implemented method of claim 1, wherein the results of performing the data integrity check that are sent to the formatted filesystem include FSCK timestamps.

5. The computer-implemented method of claim 1, wherein determining whether the portion of data is currently available includes:

determining, from the metadata tag added to the file, whether the portion of data has been exported from the clustered filesystem and/or is currently used as local storage by the formatted filesystem.

6. The computer-implemented method of claim 1, wherein the portion of data is determined to have a metadata tag which corresponds to the portion of data, wherein the determined metadata tag which corresponds to the portion of data includes information associated with the portion of data, wherein the information includes application container details.

7. A computer program product comprising a computer readable storage medium having program instructions embodied therewith, the program instructions are readable and/or executable by a processor to cause the processor to:
receive, by the processor at a backend clustered filesystem from a formatted filesystem, a request to perform a data integrity check for a portion of data;
determine, by the processor, whether an extended attribute appended to the request includes a filesystem type of the portion of data,
wherein the extended attribute is in a form of a file header;
in response to a determination that the extended attribute appended to the request includes a filesystem type of the portion of data, determine, by the processor, whether the backend clustered filesystem supports the data integrity check for the filesystem type of the portion of data;
in response to a determination that the backend clustered filesystem supports the data integrity check for the filesystem type of the portion of data, determine, by the processor, whether the portion of data is currently available;
in response to a determination that the portion of data is currently available, cause, by the processor, the data integrity check to be performed on the portion of data using the backend clustered filesystem, and in order to prevent operational duplicity, preventing the data integrity check from being performed in the formatted filesystem by not promoting the performance of the data integrity check in the formatted filesystem, wherein the data integrity check is a filesystem consistency check (FSCK) operation performed on a file that includes the portion of data; and
send, by the processor, results of performing the data integrity check to the formatted filesystem.

8. The computer program product of claim 7, wherein the program instructions are readable and/or executable by the processor to cause the processor to:
establish, by the processor, a communication channel between a FSCK process in the formatted filesystem and a FSCK process in the backend clustered filesystem,
wherein the request is received from the formatted filesystem along the communication channel,
wherein causing the data integrity check to be performed on the portion of data includes:
sending one or more instructions to a FSCK daemon associated with the FSCK process in the backend clustered filesystem to perform the data integrity check.

9. The computer program product of claim 8, wherein causing the data integrity check to be performed on the portion of data includes:
sending one or more instructions to an FSCK daemon to perform the FSCK operation.

10. The computer program product of claim 7, wherein the results of performing the data integrity check include FSCK timestamps.

11. The computer program product of claim 7, wherein determining whether the portion of data is currently available includes:
determining whether the portion of data has been exported from the backend clustered filesystem and/or is currently used as local storage by the formatted filesystem.

12. The computer program product of claim 7, wherein the portion of data has a metadata tag which corresponds to the portion of data,
wherein the metadata tag includes information associated with the portion of data,
wherein the information includes filesystem type.

13. A system, comprising:
a processor; and
logic integrated with the processor, executable by the processor, or integrated with and executable by the processor, the logic being configured to:
receive, by the processor at a clustered filesystem of a first environment from a formatted filesystem of a second environment having data storage devices with data physically stored therein, a first request to perform a data integrity check for a portion of the data,
wherein the formatted filesystem includes a plurality of containers that map back to the data physically stored in the data storage devices;
determine, by the processor, whether the first request includes a filesystem type of the portion of the data;
in response to determining that the first request includes a filesystem type of the portion of the data, determine, by the processor, whether the clustered filesystem supports the data integrity check for the filesystem type of the portion of the data;
in response to determining the clustered filesystem supports the data integrity check for the filesystem type of the portion of the data, determine, by the processor, whether the portion of the data is currently available;
in response to determining that the portion of the data is currently available, cause, by the processor, the data integrity check to be performed, wherein the data integrity check is a filesystem consistency check (FSCK) operation performed on a file that includes the portion of the data,
wherein FSCK operations are not performed by the formatted filesystem and are instead offloaded from the formatted filesystem to be performed by the processor at the clustered filesystem;
perform, by the processor, recovery actions in response to identifying inconsistencies in blocks that store the portion of the data;
in response to the recovery actions failing, translate, by the processor, results of performing the data integrity check to a form capable of being interpreted by the formatted filesystem, wherein the results of performing the data integrity check include corrupt file details and FSCK timestamps; and
send, by the processor, the translated results of performing the data integrity check to the formatted filesystem from which the first request to perform the data integrity check is received,
wherein determining whether the portion of the data is currently available includes:

determining whether the portion of the data has been exported from the clustered filesystem and/or is currently used as local storage by the formatted filesystem, wherein determining whether the first request includes a filesystem type of the portion of the data includes:

determining whether the portion of the data has a metadata tag which corresponds to the portion of the data, wherein the metadata tag includes information associated with the portion of the data, wherein the information is selected from the group consisting of:

filesystem type, input/output (I/O) activity, runtime, priority, and application container details, and the logic being configured to:

in response to a determination that the portion of the data does not have a metadata tag, send, by the processor, instructions to a FSCK daemon to add a metadata tag on the file, wherein the metadata tag is in a form of a file header;

receive, by the processor at the clustered filesystem, a second request to perform the data integrity check for the portion of the data, wherein the second request includes the metadata tag appended thereto;

extracting the metadata tag from the second request; and use, by the processor, the metadata tag appended to the second request and the metadata tag added to the file for determining whether a second request includes a filesystem type of the portion of the data, wherein the translated results include the metadata tag added on the file.

14. The system of claim 13, wherein causing the data integrity check to be performed on the portion of the data includes:

sending one or more instructions to the FSCK daemon to perform the FSCK operation.

15. The system of claim 13, wherein the logic is configured to:

establish, by the processor, a communication channel between a FSCK process in the formatted filesystem and a FSCK process in the clustered filesystem, wherein the first request is received from the formatted filesystem along the communication channel, wherein causing the data integrity check to be performed on the portion of the data includes:

sending one or more instructions to the FSCK daemon associated with the FSCK process in the clustered filesystem to perform the data integrity check.

16. The system of claim 13, wherein extracting the metadata tag from the second request includes exporting inode data and/or structural information from files that are formatted in local formatted filesystems, wherein the local formatted filesystems include the formatted filesystem, wherein the exported inode data includes a permission list associated with the files and an owner of the files.

* * * * *